United States Patent

[11] 3,618,774

[72] Inventor Dale Delphia
Route 3, Box 164 A, Newberg, Oreg. 97132
[21] Appl. No. 7,561
[22] Filed Feb. 2, 1970
[45] Patented Nov. 9, 1971

[54] COMBINATION SWIMMING POOL FILTER, SURFACE SKIMMER AND WATER LEVEL CONTROL DEVICE
23 Claims, 5 Drawing Figs.

[52] U.S. Cl.................................................. 210/128, 210/169, 210/317
[51] Int. Cl......................................................... E04h 3/20

[50] Field of Search........................................ 210/128, 129, 169, 238, 282, 283, 317

[56] References Cited
UNITED STATES PATENTS
2,809,752  10/1957  Leslie......................... 210/169 X
2,844,255  7/1958   Cavehah et al.............. 210/169 X

*Primary Examiner*—Frank A. Spear, Jr.
*Attorney*—Daniel P. Chernoff

ABSTRACT: A swimming pool filter unit comprising filter and sand layers, some of the sand cleanable by removing a containing basket, the unit also having automatic pool fill control and overflow drain means.

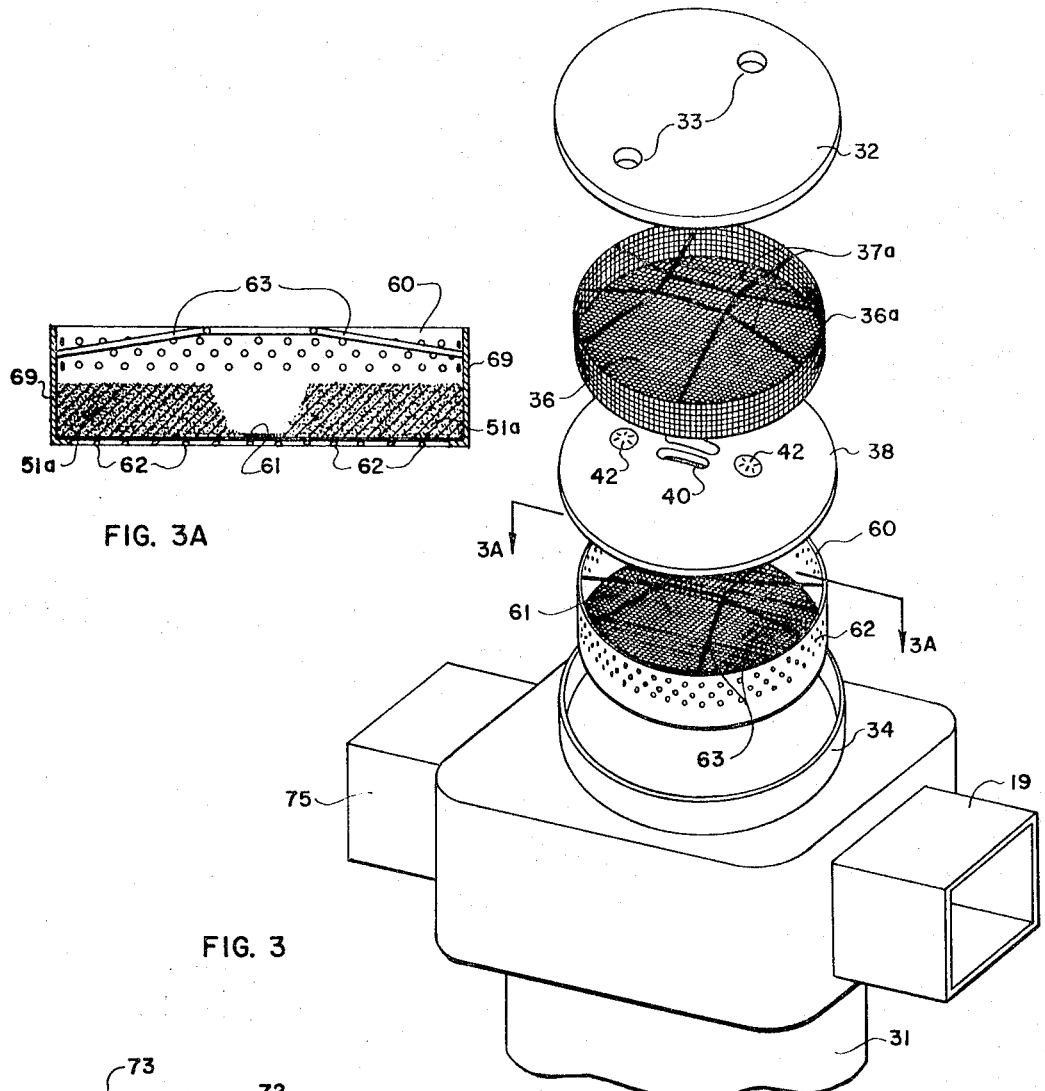
FIG. 3A
FIG. 3
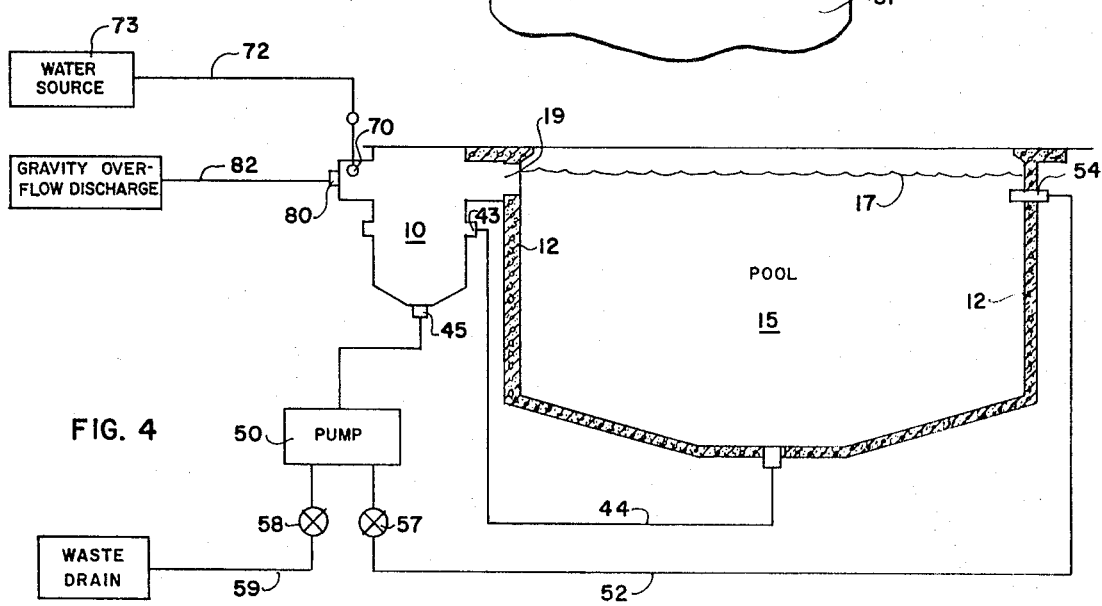
FIG. 4

COMBINATION SWIMMING POOL FILTER, SURFACE SKIMMER AND WATER LEVEL CONTROL DEVICE

BACKGROUND OF THE INVENTION

This invention relates to fluid-filtering devices and more particularly to a swimming pool filter unit utilizing a sand-based filtering medium for cleansing water of impurities, the unit also being provided, as an integral part thereof, with means for skimming and collecting leaves and other debris, and means for automatically controlling the water level in the swimming pool tank.

Water-filtering devices especially adapted for use in small closed-circulation swimming pools for skimming and collecting leaves, bugs and other debris and thereafter cleansing minute impurities from the water prior to its recirculation to the pool tank have long been known to the art. It is highly desirable to provide in such pool installations a filter unit a type which does not require periodic backwashing of the filter medium in order to cleanse the unit, as the tens of gallons of waste water produced in the backwashing process represents a sizeable cost in water charges to the pool owner, especially in the warmer climates where pools are more prevalent. Further, filters of the backwash type require additional piping and valve connections as well as fairly complex cycle control means, thus further increasing the cost of the filter installation.

In an effort to reduce the cost and running expense of the filter unit, especially for small residential swimming pool installations, filters have been developed for use in this specific application employing filtering elements or mediums which can be readily removed from the filter unit for periodic cleaning or replacement. Of the more popular filter units of this type are those described in Pace U.S. Pat. No. 2,826,307 and Cavenah et al. U.S. Pat. No. 2,844,255 which utilize a filter element in the form of a tubular core provided with a plurality of perforated filter plates which is cleaned by removing the element from the filter unit and rinsing it with a garden hose or the like. Upon removal of the filter element for cleaning, the filter container can, in which a dirty slurry remains, must still itself be backwashed by pumping this residue to a waste line. To effectuate the filtering action, removable filters of the Pace and Cavenah et al. type employ a filter clay such as diatomaceous earth to trap the minute impurities carried by the water. The filter clay which collects on the inlet openings of the filter plates is washed away in the cleaning process and thus must be periodically replenished in the filter unit. In addition to the messy and distasteful chore, from the pool operator's standpoint, of rinsing away the dirty residue from the filter plates in order to cleanse the element, the regular replacement of diatomaceous earth or other suitable filter clay substantially increases the operating costs for the swimming pool system.

Because of these respective deficiencies of the conventional backwashing and removable types of filter units there has been a long-felt need for a swimming pool filter unit, particularly adapted for the smaller tank installation used in private residences, which would be simpler to clean an more economical to install and operate than those heretofore known to the art.

In addition to the above-mentioned disadvantages of conventional types of filtering devices, swimming pool installations typically employ a plurality of discrete individual components, separate from the filter unit and coupled thereto by lengths of piping, to regulate the water level in the swimming pool tank within a prescribed range, i.e., adding water to the system when the level drops too low and alternatively draining away excess water when the level reaches a predetermined maximum height. The field connection of the filter unit to these water level regulator elements, and the added plumbing costs and materials necessitated thereby, materially increase the cost of the water circulation portion of the swimming pool installation.

SUMMARY OF THE INVENTION

The present invention discloses a removable, readily cleaned nonbackwashing type of filter element of novel and inexpensive design for a swimming pool filter unit. The filter is combined with a surface skimmer and an automatic water level control means to form a compact factory-assembled integral unit which eliminates a considerable amount of the labor and material cost associated with the coupling up of these individual components in a conventional pool installation. The filtering portion of the unit, in addition to having a removable wire mesh basket for collecting leaves, bugs and other debris collected at the inlet of the unit, comprises a cylindrical vertical tank fitted at its top with a removable lid provided with a pair of flow adjustment means therein for regulating the flow of water therethrough. Water entering the filter unit, both from the surface of the pool as well as at a second entry point coupled to the bottom of the pool, is drawn by pump action through a sand-filtering medium, the filtered water is exhausted from the filter unit at the bottom through a suitable underdrain element whose openings are sufficiently small to prevent sand particles from draining therethrough. The now-purified water is thereafter drawn through the pump and then returned to the pool for recirculation.

The top portion of the sand beds contained within a cylindrical mesh basket whose base is formed of a water-permeable grid of mesh size sufficiently small to prevent passage of sand particles therethrough. By far the greater percentage of dirt and other impurities contained in the water passing through the filter is trapped in this initial portion of the sand bed. The remaining portion of the sand bed, constituting the greater bulk of the total depth of filtering medium contained in the unit, remains substantially uncontaminated in the course of operation of the filter since only a small amount of the impurities contained in the water supply avoids extraction in the initial portion of the sand bed. The mesh basket containing the topmost portion of the filtering medium is readily removable from the unit so that the sand contained therein can be dumped out together with its entrapped residue and the basket refilled with a fresh supply of sand at sufficiently regular intervals to prevent its becoming saturated with residue material from the water supply. Since sand is quite inexpensive and only a small portion of the total sand bed need be replaced in order to empty out the dirt particles entrapped in the filtering medium, the material costs for running operation of the filter unit are minimal. The lower portion of the sand bed, that is, the sand depth below the bottom of the mesh basket, remains relatively clean during the course of operation of the unit functioning essentially as a polishing agent on the water, and need not be replaced except at relatively long intervals. Preferably, the lower portion of the sand filter bed is comprised of a layer of somewhat coarser particles than that in the upper portion so as to permit use of a water underdrain element in the filter unit having larger water inlet openings than would be feasible if fine sand were used throughout.

Immediately preceding the filter portion of the unit there is provided a floatation-type weir in the water inlet to the unit positioned so as to skim the surface of the pool water as it spills over into the filter. In addition there is integrally formed on the filter unit near its inlet and at the waterline of the pool a compartment housing a water level control means in the form of an automatic fill device acting in conjunction with an overflow drain to maintain the water level of the pool within predetermined limits. The filter unit is further provided with water flow control means and a shutoff valve on its water inlets to convert the unit for vacuum-cleaning operation.

It is therefore a principal objective of the present invention to provide a new and improved nonbackwashing-type swimming pool filter which is easier to maintain and less costly to manufacture and operate than filter units heretofore known to the art.

It is a further objective of the present invention to provide a swimming pool filter unit of the type described containing as an integral part thereof means for skimming the surface of the pool waterline and automatic means for maintaining the water level of the pool within predetermined limits.

It is a principal advantage of the filter unit of the present invention that the filter medium employed is comprised of inexpensive and widely available sand material in contrast to more costly special filtering clays, and that only a portion of the filtering medium need be replenished in the regular maintenance of the filter unit during the course of a season.

It is a further advantage of the filter unit of the present invention that the filtering element can be readily and neatly removed from the unit, cleaned, refilled and replaced in a minimum of time and without necessitating any draining of the swimming pool or disabling of any controls to the swimming pool installation.

It is a principal feature of the present invention that a single factory-built compact unit combines the functions of filtering, surface skimming and automatic water level control so that it can be quickly and inexpensively installed at the job site with a minimum of labor and materials for connection.

The foregoing and other objectives feature and advantages of the present invention will be more readily understood upon consideration of the following description of the invention, taken in conjunction with the accompanying drawings.

BRIEF DESCRIPTION OF THE DRAWINGS

FIG. 3 is an exploded, perspective view of a detail of the filter unit shown in FIG. 1 illustrating the components of the filter which are removed for cleaning of the filter.

FIG. 3A is an enlarged front sectional view, taken along the line 3A—3A of FIG. 3, showing the wire mesh basket which contains the upper portion of the sand bed.

FIG. 4 is a schematic diagram showing a typical hookup connection of the filter unit to a swimming pool installation.

DESCRIPTION OF THE PREFERRED EMBODIMENT

Figure 1:
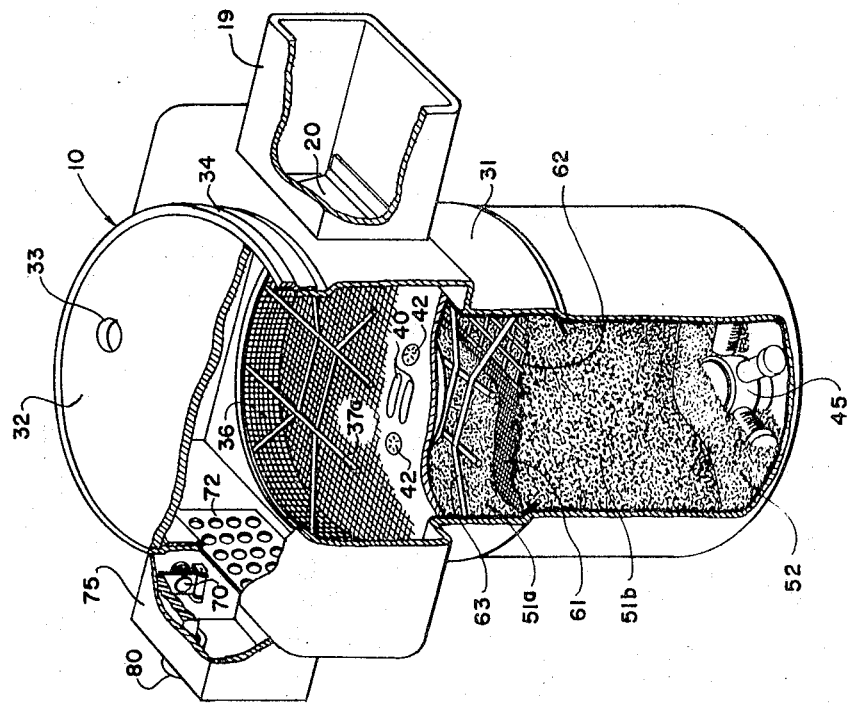
FIG. 1 is a perspective view, partially broken away, showing an illustrative embodiment of a swimming pool filter unit in accordance with the present invention.

Referring to the FIGS., the filter unit of the present invention, designated generally as 10, is installed in the wall 12 of a pool tank 15 having a usual surface water level 17. The filter unit 10 is in the form generally of a vertical cylindrical tank comprised of three major portions: (a) a surface skimmer provided by weir 20, (b) a debris trap and rapid sand filtration element 30, and (c) an automatic water level control means consisting of a water intake valve 70 and an overflow drain 80.

An inlet passage 19 formed in the upper sidewall of the filter unit communicates through the pool wall 12 to the pool tank 15. Water from the pool is drawn into and through the rapid sand filter unit 10 by the suction or negative pressure produced by a pump 50 (FIG. 4) which may be of any suitable design capable of handling swimming pool circulatory flow requirements of the order of 20 gallons per square foot per minute. After passage through the pump the water is recirculated to the tank via a wall outlet 54 coupled to the pump discharge by line 52.

A flat disc-shaped lid 32, provided with finger-grasping holes 33 to permit ready removal, sits on the interior shoulder of a circular end flange 34 provided on the top edge of the cylindrical wall 31 of the filter unit so as to provide a protective close over the top of the unit. The lid 32 and the supporting end flange 34 are preferably configured so that the lid lies flush with the level of the tile wall 12 and deck surface 14 surrounding the pool.

After being skimmed by passage over the weir 20 the surface water 17, drawn in by the pump 50, passes downward into the filter unit through initially a debris basket 36 formed of screen wire mesh whose cylindrical sidewall nests snugly with a minimum clearance against the mating interior wall surface 31 of the unit and is supported by legs 37b which rest on top of a cover plate member 38. To permit removal, and also to reinforce and strengthen the screen structure of the basket 36, a welded-wire handgrip 37a is secured at spaced points around the upper periphery of the debris basket. This debris basket 36 acts as a gross filter to trap leaves, bugs and other relatively large-scale debris floating on the top of the pool.

Next in sequence from the debris basket is a circular cover plate member 38 which contacts the cylindrical sidewall 31 of the unit and rests on an inwardly projecting shoulder 39 formed thereon. The cover plate 38 is bowed slightly upwardly into a convex shape and is provided with a recessed handhold 40 to facilitate its removal from the filter unit during the cleaning operation. The cover plate nests snugly against the shoulder 39 and adjacent sidewall 31 to provide substantially a watertight seal so that water passage through the member is provided exclusively by openings 41 therein which are fitted with adjustable flow control devices 42. The flow control devices may comprise, for example, a pair of coaxially mounted perforated discs which may be rotated in relation to each other so as to vary the size of the apertures permitting water to pass therethrough.

Immediately beneath the cover plate member 38 is a second inlet passage 43 which is coupled to a conduit line 44 drawing water from the bottom of the pool tank 15 (FIG. 4). The passage 43 is preferably in the form of a threaded pipe stub so as to readily connect with a conventional tubular pipe line. As a convenience in installation, an alternate inlet passage 43a is provided in the filter unit sidewall at a diametrically opposed location, and when not in use the alternate pipe stub may be sealed off with plug 46. Thus in the region of the filter unit just beneath the cover plate 38 the water from the surface of the pool, now skimmed and cleansed of debris, is mixed with water drawn from the pool bottom, and the resultant mixture is drawn through the filter bed of the unit under the action of the pump 50.

The sand bed is situated in the lower and bottom portion of the filter 30 and acts as a filtering agent on the water drawn from the pool surface and bottom before it is exhausted from the unit through underdrain element 45. The sand bed preferably consists of two layers, a first layer 51 being constituted by sand of relatively fine size, on the order for example of No. 16 mesh; and a second lower 52 of somewhat coarser size, on the order for example of No. 8 mesh. By the term "sand" is meant conventional silica sand material, pulverized volcanic rock material or other particulate material providing comparable filtering action.

The top stratum 51a of the first layer of fine sand 51 is contained within a cylindrical basket member 60, constructional details of which are best shown in FIG. 3A. If desired, filter paper or other disposable foraminous sheet material (not shown) may be provided overlying the upper surface of the top stratum 51a so as to assist in the filtering action and thereby reduce the thickness of the sand layer required in this stratum. The basket 60 is provided with a wire screen bottom 61 supported on a wire grid frame 62 and having a mesh size slightly smaller than the particulate size of the sand 51 contained therein. In this matter the upper stratum portion of the sand layer 51 will remain in the bottom of the basket 60 when the latter is removed from the filter unit, although water at all times is free to pass substantially unimpeded therethrough. A wire handhold 63 is provided and secured at spaced points around the upper periphery of the basket 60 to assist in the removal of the member from the unit during the cleaning operation. The upper portion of the cylindrical sidewall 69 of the basket member is perforated by a plurality of spaced apertures 65 which permit the water contained on the top of the sand layer 51 to drain out radially from the sidewall as the basket member is removed upwardly from the filter unit in the course of the cleaning operation.

Figure 2:
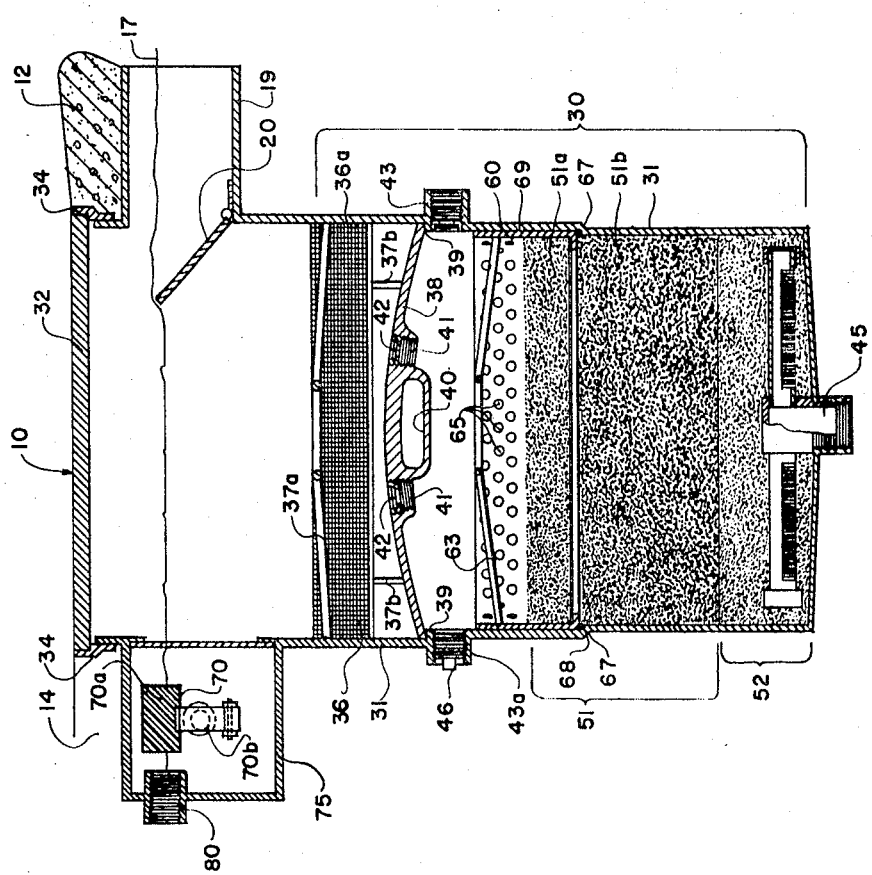
FIG. 2 is a front sectional view of the filter unit of FIG. 1 installed in the wall of a swimming pool.

As best shown in FIG. 2, in the normal running mode of the filter unit the basket 60 is supported on an interior shoulder 67 formed in the cylindrical sidewall 31 of the filter unit and in watertight sealing engagement therewith by means of a compressible O-ring gasket 68. The basket is filled with a stratum of sand 51a to about half its height, so that the sand level is just beneath the lower ring of apertures 65 provided in the upper reach of the basket's sidewall 69. The sand stratum contained in the basket 60 is preferably of the same grade, quality and size as that contained in the lower stratum portion 51b of the first sand layer, although this is not necessarily so since the filter unit may be feasibly used with sand of differing quality and size in respective strata 51a and 51b. However, it is apparent that the filter unit is easier and more economical to operate and maintain if the sand bed is formed of, at most, two different sand materials, and the utilization of a third sand differing in size, grade or quality from any of the other two would introduce needless complications and expense; although it is to be understood that there is no substantial function impediment to utilizing differing sand materials to form the respective strata 51a and 51b. The depth of the sand strata 51a contained within the bottom of the basket 60 would be on the order of 1 ½ to 2 inches in a typical embodiment of the filter unit of the present invention in which the entire sand bed comprised of layers 51 and 52 would be of a total depth of 12 to 14 inches.

In the illustrative embodiment shown the filter bed strata 51a and 51b are formed of the same sand material. In operation the upper strata 51a traps virtually all of the dirt and other minute impurities contained in the pool water, and only a minimal portion of this foreign matter penetrates into the lower stratum 51b so long as the upper stratum 51a is regularly removed and replenished with fresh filter material. Thus, in effect, the lower stratum 51b forming the first layer of the sand bed acts essentially as a polishing agent and accordingly need only be replaced on an infrequent basis, perhaps once every several years. The lower layer 52 of somewhat coarser sand in the upper layer 51 and the underdrain element 45 so as to permit the apertures in the latter, through which the filtered water is exhausted from the unit, to be of nominal size rather than subminiature as would be the case if the underdrain element were in direct contact with the fine-sized sand particles constituting the first layer 51. The underdrain element 45 may be of any suitable type known to the art for exhausting water from the bottom of the filter unit while preventing the draining of sand or other filter material therethrough.

As depicted in the exploded view of FIG. 3, the filter elements may be readily removed from the unit for cleaning by merely lifting them vertically upward through the top opening which is normally covered in use by the lid 32. After removal of the lid the debris basket 36 is accessible and can be lifted out for dumping and then replacement. This can be done as frequently as necessary without inhibiting the circulation of pool water through the filter unit or otherwise disturbing the other elements of the device. On a regular, but far less frequent basis, when the debris basket 36 is removed for emptying, the cover plate member 38 is also removed exposing the underlying basket 60 containing the upper stratum 51a of filter sand. This latter basket is lifted upward and, as it is removed, the water carried in the container and resting on the top of the sand strata quickly drains off through the radial openings 62 provided in the basket sidewall 69. In this manner, by the time the basket 60 is withdrawn through the top collar 34 of the filter unit, most of the water has drained back in the unit and only a small amount of water remains as the residue in the basket to drip out as the element is carried off for dumping of the waste material. After dumping of the sand strata 51a containing the trapped dirt impurities which have been extracted from the pool water, the strata is reconstituted with new sand and the basket 60 thereafter replaced into the filter unit with the remaining elements following in reverse order from the sequence of their removal from the unit.

It is to be especially noted that the aforementioned filter-cleaning operation does not necessitate the shutdown of the pool circulation, nor does it permit dirty water to be circulated through the filter lines and filter pump for reintroduction into the pool, as even with the basket 70 temporarily removed the lower strata of fine sand 51b remains in the unit to cleanse the water in that short period of time during which the sand basket is being cleaned. With periodic servicing of the sand basket 60 and the replacement of the upper stratum 51a as it becomes saturated, the lower stratum 51b as well as the underlying second layer 52 will stand up for a long period of time, typically an entire season, without need for replacement.

Turning away now from the filter element 30, the unit is additionally provided with means for maintaining automatic water level control in the swimming pool tank. A compartment 75 is formed out of the upper sidewall 31 of the unit, preferably at a position diametrically opposed from that of the inlet passage 19, which communicates with the water level in the pool 15. Across the face of the opening connecting the compartment 75 to the interior of the cylindrical filter unit an apertured baffle 72 is positioned so as to prevent the entry of debris into the compartment and also to dampen wave oscillations in the water level 17 as it enters from the tank into the compartment.

Positioned in a wall of the compartment is an automatic fill device which may exemplarily be in the form of a spring-actuated float valve 70 which automatically opens to permit water to enter when the pool level 17 drops below a predetermined minimum threshold. Fresh water is delivered to the valve opening 70 via a conduit line 72 connected to a water source 73. Thus, if the water level should drop below a predetermined minimum level, the float 70a connected to the top of a spring-biased lever arm 70b drops downward in a vertical arc, thereby opening the valve and permitting water to enter from the supply line 72 into the compartment to restore the level of water in the pool tank.

In the same compartment 75, and also positioned on a wall thereof, is a gravity-fed overflow device in the form of a tubular aperture 80 which couples to a discharge line 82 for draining away water from the pool when the pool level 17 reaches or exceeds a predetermined maximum threshold. Adjustment of the spring bias on the lever arm 70b of the automatic fill device 70 permits adjustment of the range separating the minimum threshold level at which water is automatically introduced into the pool from the maximum threshold level at which water commences to drain out through the gravity discharge device 80.

To convert the filter unit for vacuum-cleaning operation a suitable vacuum attachment device (not shown) is coupled to one or the other of the two openings 41 formed in the cover plate member 38 (the lid 32 and debris basket 36 having previously been removed to permit access to the coupling juncture), and the flow passage in the other of the two adjustment means 42 concomitantly closed down to shut off or minimize the flow of water therethrough. The pump 50 will in this mode of operation then draw water through the filter device and the vacuum attachment under high suction, permitting rapid vacuum cleaning of the tank walls of the pool in the conventional manner.

The filtration system is also designed so that all of the water may be conveniently and expeditiously drained from the pool, when desired, by shutting off the two flow apertures 42 passing water from the surface of the pool, closing down valve 57 in the recirculating line 52, and concurrently opening valve 58 in waste line 59 connecting to a drain.

The terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A filter unit for a swimming pool comprising:

a. a vertically positioned container of generally tubular form having water ingress means at one end communicating with the surface water level of said pool and water egress means at the other end coupled to a pump for drawing water from said pool through said container, b. a debris basket in said container following said water ingress means for collecting leaves, twigs, bugs and other large scale debris, c. a layer of fine sand material in said container following said debris basket, said layer being of sufficient thickness to trap minute impurities carried in the water passing through said unit, and d. a removable basket having a foraminous bottom of mesh size finer than that of said sand material, said basket being positioned in said sand layer and containing therein the upper portion of said sand layer.

2. The filter unit of claim 1 further provided with an additional water ingress means in said container positioned between said debris basket and said sand layer and coupled to a water drain in the bottom of said pool so that water from said pool bottom is also drawn through said filter unit.

3. The filter unit of claim 2 further characterized in that a cover plate member is positioned in said container between said debris basket and said additional water ingress means and is provided with flow control means for adjusting the amount of water drawn from said pool surface through said filter unit by said pump.

4. The filter unit of claim 3 wherein said cover plate member is in the form of a circular disk of solid material in watertight sealing engagement with the interior wall surface of said filter container and said flow control means is in the form of a plurality of variable-diameter apertures in said cover plate member.

5. The filter unit of claim 4 wherein said filter unit is adapted for vacuum-cleaning operation by closing off all but one of said apertures in said cover plate member and connecting a vacuum-cleaning hose accessory to the other of said apertures.

6. The filter unit of claim 1 further provided with a weir of buoyant material pivotably mounted in said water ingress means for skimming the surface of said pool water drawn into said unit.

7. The filter unit of claim 1 further characterized in that a compartment is formed on the vertical wall surface of said container having a passageway communicating with the surface water level of said pool, said compartment containing (a) a float valve means controlling the addition of water to the pool from a water supply source, said float valve automatically opening to permit the flow of water therethrough when the pool level drops below a predetermined minimum threshold, and (b) an overflow device coupled to a discharge line for draining away water from the pool when the pool level reaches a predetermined maximum threshold.

8. The filter unit of claim 7 wherein an apertured plate is interposed in said passageway connecting said compartment to said filter container for the purposes of both preventing the entry of debris into said compartment and dampening wave oscillations in water entering said compartment.

9. The filter unit of claim 1 further characterized in that said sand layer is comprised of two strata of differing mesh size, the first stratum, a portion of which is contained inside said basket, having a particle size substantially smaller than the second stratum of sand material which is located beneath said basket.

10. The filter unit of claim 9 further characterized in that said water egress means is in the form an underdrain element embedded in said second sand stratum and having apertures therein for extracting water from said filter container which are of smaller size than the particles comprising said second sand stratum, but of greater size than the particles comprising said first sand stratum.

11. The filter unit of claim 1 wherein the foraminous bottom of said basket is comprised of a sheet of wire screening of the prescribed mesh size.

12. The filter unit of claim 11 wherein said basket containing the upper portion of said sand layer is further characterized in that it is of generally squat cylindrical form and the sidewall which rises above said foraminous bottom is nonpervious from said bottom to the normal level of said sand material therein and above said normal sand level said sidewall is perforated with a plurality of apertures so as to permit the draining of water radially from said basket when it is withdrawn from said filter unit.

13. The filter unit of claim 1 further characterized in that a cover plate member is positioned in said container between said debris basket and said sand layer and is provided with flow control means therein for adjusting the amount of water drawn from said pool through the filter unit by said pump.

14. A filter unit for a swimming pool comprising:

a. a container of generally cylindrical form adapted for vertical mounting on the side of a swimming pool tank and covered by a removable lid member, b. a first water ingress means in the form of a passageway provided in the sidewall of said container near the upper end thereof communicating with the surface water level of said pool, c. a removable debris basket of cylindrical form fitting inside said filter container and positioned beneath said first water ingress means, d. a removable cover plate member of circular disc form positioned beneath said debris basket and in watertight sealing engagement with the interior wall of said filter container, said cover plate member being provided with variable flow control means permitting the passage of water therethrough, e. a second water ingress means mounted in the sidewall of said filter container beneath said cover plate member and coupled to a water drain in the bottom of said pool, f. a removable basket member nesting inside said container and positioned beneath said second water ingress means, said basket member having a foraminous bottom, g. a layer of fine sand material contained within said basket member and having a mesh size slightly larger than the openings in said basket bottom, and h. a water egress means situated in the lower end of said container beneath said basket member and coupled to a pump for drawing water from said pool through said container.

15. The filter unit of claim 14 further characterized in that the space inside said container beneath said basket member is substantially filled with sand material.

16. The filter unit of claim 15 wherein said sand filling is comprised of two strata of differing mesh size, the first stratum located immediately beneath said basket member being of substantially the same mesh size as the sand layer contained in said basket member, and the second stratum having a mesh size substantially greater than said first sand stratum.

17. The filter unit of claim 16 wherein said water egress means is in the form of an underdrain element embedded in said second sand stratum and having apertures therein for extracting water from said filter container which are of smaller size than the particles comprising said second sand stratum, but of greater size than the particles comprising said first sand stratum.

18. The filter unit of claim 14 further characterized in that said basket member is of a generally squat cylindrical configuration, with a bottom formed of a sheet of wire screening of the prescribed mesh size and a sidewall which is nonpervious from said bottom to the normal level of said sand layer contained therein and above said normal sand level said sidewall is perforated with a plurality of apertures so as to permit the draining of water radially from said basket when it is withdrawn from said filter unit.

19. The filter unit of claim 14 further characterized in that a compartment is formed on the vertical wall surface of said container near the upper end thereof having a passageway communicating with the surface water level of said pool, said compartment containing (a) a float valve means controlling the addition of water to the pool from a water supply source, and (b) an overflow device coupled to a discharge line for draining away excess water from said pool.

20. The filter unit of claim 19 further provided with a weir of buoyant material pivotably mounted in the passageway of said first water ingress means for skimming the surface of said pool water drawn into said unit.

21. A compact, integrated filter unit for a swimming pool comprising a housing containing therein:
   a. water ingress means for communicating with the surface water level of said pool,
   b. a weir element for surface skimming the pool water entering said unit,
   c. a removable debris basket for collecting large scale debris,
   d. a filtration element for extracting minute impurities from the water flowing through said unit,
   e. water egress means for coupling to a pump drawing water from said pool through said unit,
   f. a fill device responsive to the surface water level of said pool for causing water to be added when the pool level drops below a predetermined minimum threshold, and
   g. an overflow device adapted to couple to a discharge line for draining away water from the pool when the pool level reaches a predetermined maximum threshold.

22. The filter unit of claim 21 wherein said housing further contains an additional water ingress means adapted to couple to a water drain in the bottom of said pool.

23. The filter unit of claim 22 further characterized in that flow control means are provided in said housing for adjusting the relative flows of water permitted to be drawn into said unit through the respective water ingress means.

* * * * *

UNITED STATES PATENT OFFICE
CERTIFICATE OF CORRECTION

Patent No. 3,618,774    Dated January 17, 1972

Inventor(s) Dale Delphia

It is certified that error appears in the above-identified patent and that said Letters Patent are hereby corrected as shown below:

Col. 1, Line 18  After "unit" insert --of--;

Line 60  Change "an" to --and--.

Col. 2, Line 26  Change "beds" to --bed--.

Col. 3, Line 24  Change "feature" to --features--;

Line 69  Change "close" to --closure--.

Col. 4, Line 47  After "lower" insert --layer--.

Col. 5, Line 38  After "sand" insert --serves primarily as a buffer medium between the fine-sized sand--.

Col. 6, Line 5  Change "70" to --60--.

Signed and sealed this 16th day of May 1972.

(SEAL)
Attest:

EDWARD M. FLETCHER, JR.    ROBERT GOTTSCHALK
Attesting Officer          Commissioner of Patents